United States Patent
Inano et al.

(10) Patent No.: US 10,790,727 B2
(45) Date of Patent: Sep. 29, 2020

(54) COOLING APPARATUS FOR ROTATING ELECTRICAL MACHINE

(71) Applicant: TOYOTA JIDOSHA KABUSHIKI KAISHA, Toyota-shi, Aichi-ken (JP)

(72) Inventors: Hiroshi Inano, Miyoshi (JP); Shigeru Kimura, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 166 days.

(21) Appl. No.: 16/175,043

(22) Filed: Oct. 30, 2018

(65) Prior Publication Data
US 2019/0165654 A1    May 30, 2019

(30) Foreign Application Priority Data
Nov. 24, 2017    (JP) .................................. 2017-225874

(51) Int. Cl.
*H02K 9/24*    (2006.01)
*H02K 9/19*    (2006.01)
(Continued)

(52) U.S. Cl.
CPC ................ *H02K 9/19* (2013.01); *H02K 1/32* (2013.01); *H02K 7/003* (2013.01); *H02K 7/006* (2013.01);
(Continued)

(58) Field of Classification Search
CPC .......... H02K 9/005; H02K 9/19; H02K 9/193; H02K 9/24
See application file for complete search history.

(56) References Cited

U.S. PATENT DOCUMENTS 8,129,873 B2 * 3/2012 Rai .................... G01K 13/02
310/53
8,432,075 B2 * 4/2013 Fulton ................. H02K 9/19
310/52
(Continued)

FOREIGN PATENT DOCUMENTS

CN    105680623 A    6/2016
JP    2008-178243 A    7/2008
(Continued)

*Primary Examiner* — Ramon M Barrera
(74) *Attorney, Agent, or Firm* — Oliff PLC

(57) ABSTRACT

A cooling apparatus includes: an intra-axle coolant supply unit supplying coolant into a rotation shaft of a rotating electrical machine; a coolant discharge unit pouring coolant onto the rotating electrical machine, wherein the coolant is conducted in a predetermined distribution ratio to the intra-axle coolant supply unit and the coolant discharge unit; a flow rate adjustment device capable of adjusting a supply flow rate of the coolant; and a control device functioning as: a determination device determining overheating of the rotating electrical machine caused by deviating allocation of the coolant to the intra-axle coolant supply unit in an increase direction as compared to the predetermined distribution ratio; and a recovery device controlling the flow rate adjustment device to implement a recovery operation in which the supply flow rate is decreased and then elevated, when the determination device has determined that the overheating of the rotating electrical machine is occurring.

10 Claims, 5 Drawing Sheets

(51) Int. Cl.
*H02K 7/00* (2006.01)
*H02K 11/25* (2016.01)
*H02K 1/32* (2006.01)
*F16H 57/04* (2010.01)
*B60K 6/36* (2007.10)

(52) U.S. Cl.
CPC .............. *H02K 9/24* (2013.01); *H02K 11/25* (2016.01); *B60K 6/36* (2013.01); *B60Y 2200/92* (2013.01); *B60Y 2306/05* (2013.01); *F16H 57/0446* (2013.01)

(56) References Cited

U.S. PATENT DOCUMENTS

| | | | |
|---|---|---|---|
| 9,473,002 B2* | 10/2016 | Vallinayagam | H02K 5/20 |
| 9,960,728 B2* | 5/2018 | Ito | H02K 9/19 |
| 2009/0127954 A1* | 5/2009 | Mogi | B60K 17/12 |
| | | | 310/90 |
| 2011/0120394 A1 | 5/2011 | Onozawa et al. | |
| 2016/0164377 A1 | 6/2016 | Gauthier et al. | |
| 2016/0164378 A1 | 6/2016 | Gauthier et al. | |

FOREIGN PATENT DOCUMENTS

| | | |
|---|---|---|
| JP | 2011-111910 A | 6/2011 |
| JP | 2011-211844 A | 10/2011 |

* cited by examiner

[FIG.1]
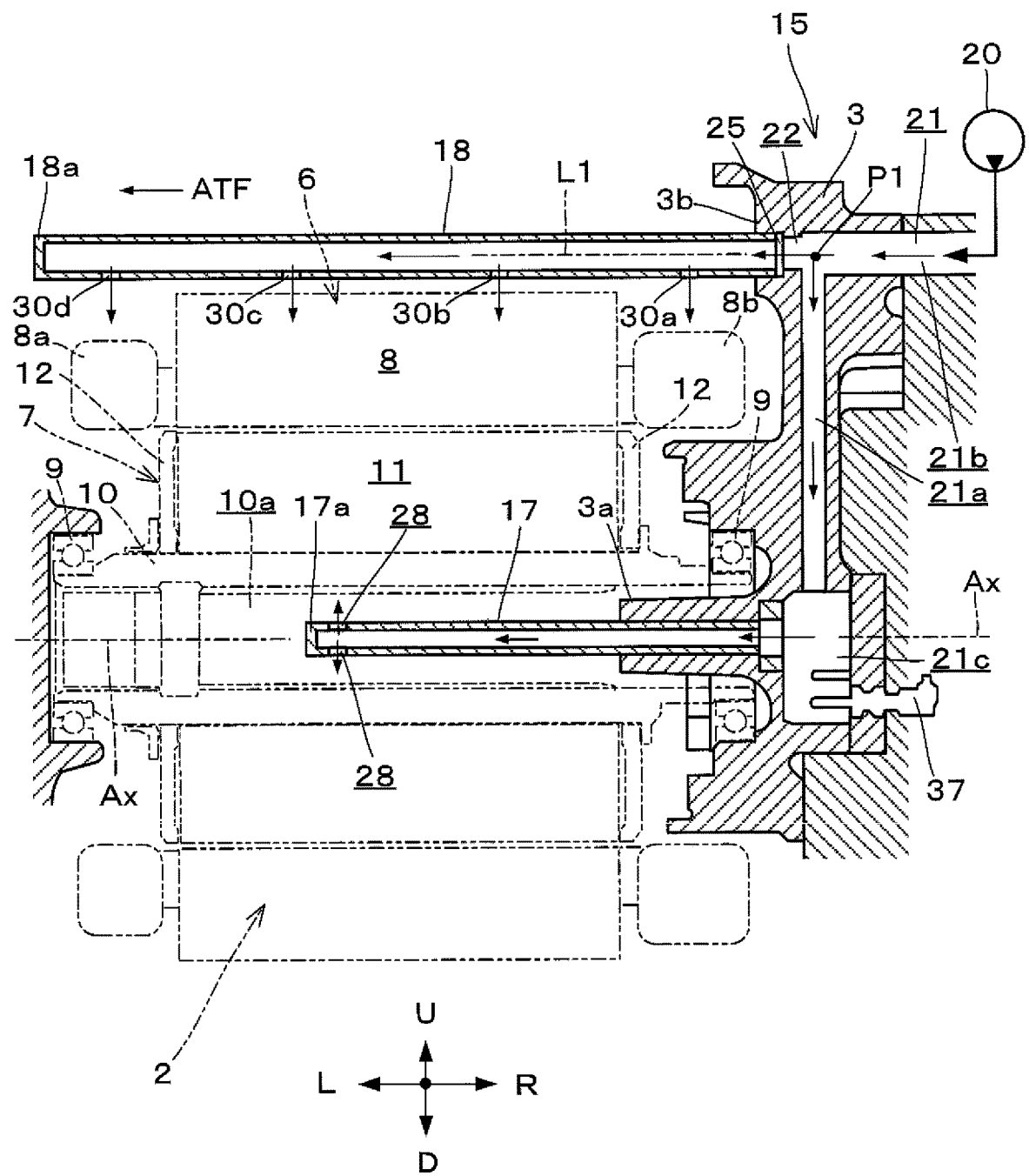

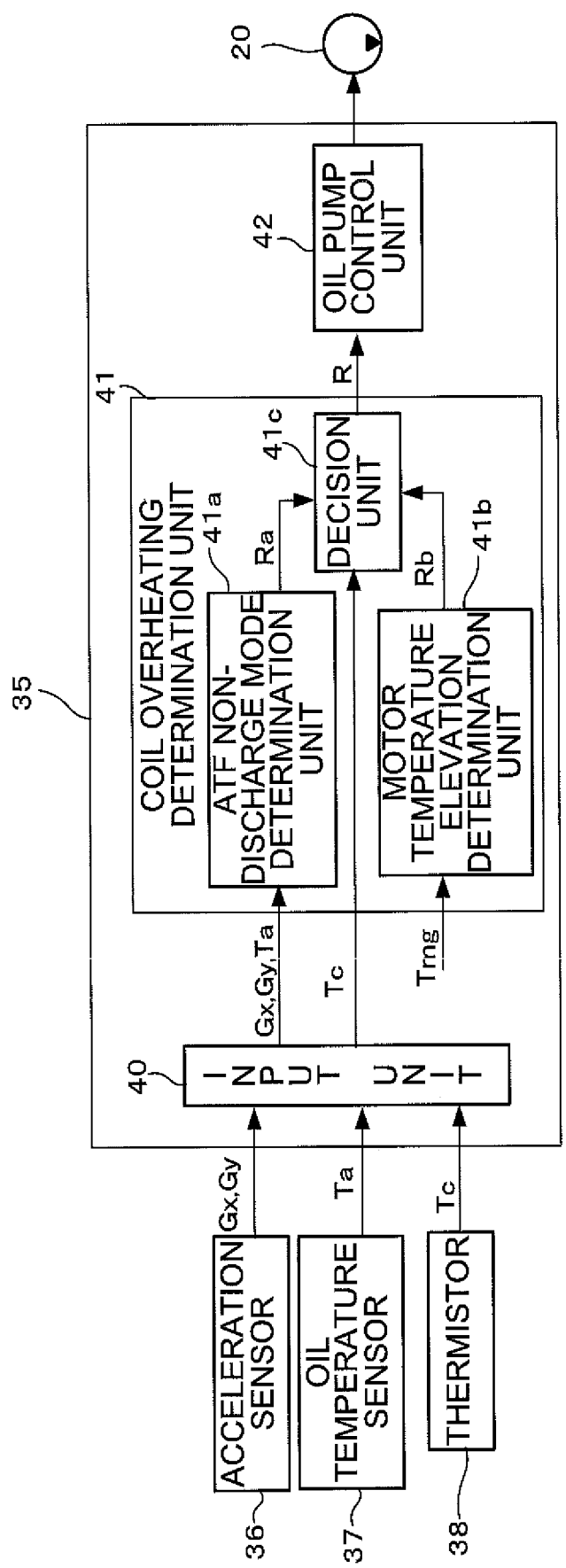
[FIG.2]

【FIG.3A】
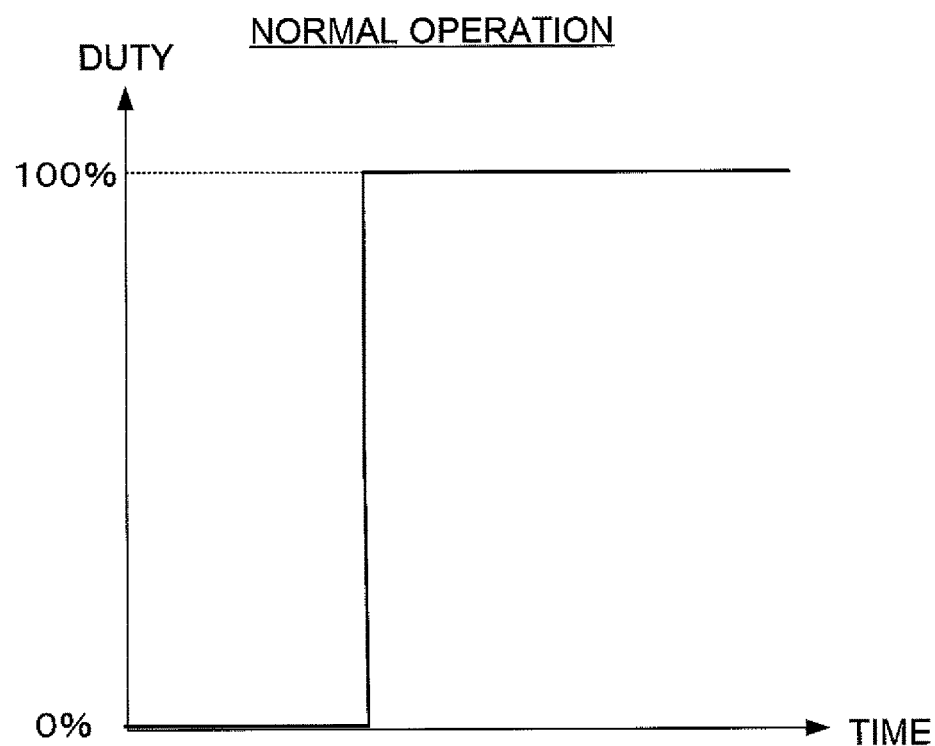
【FIG.3B】
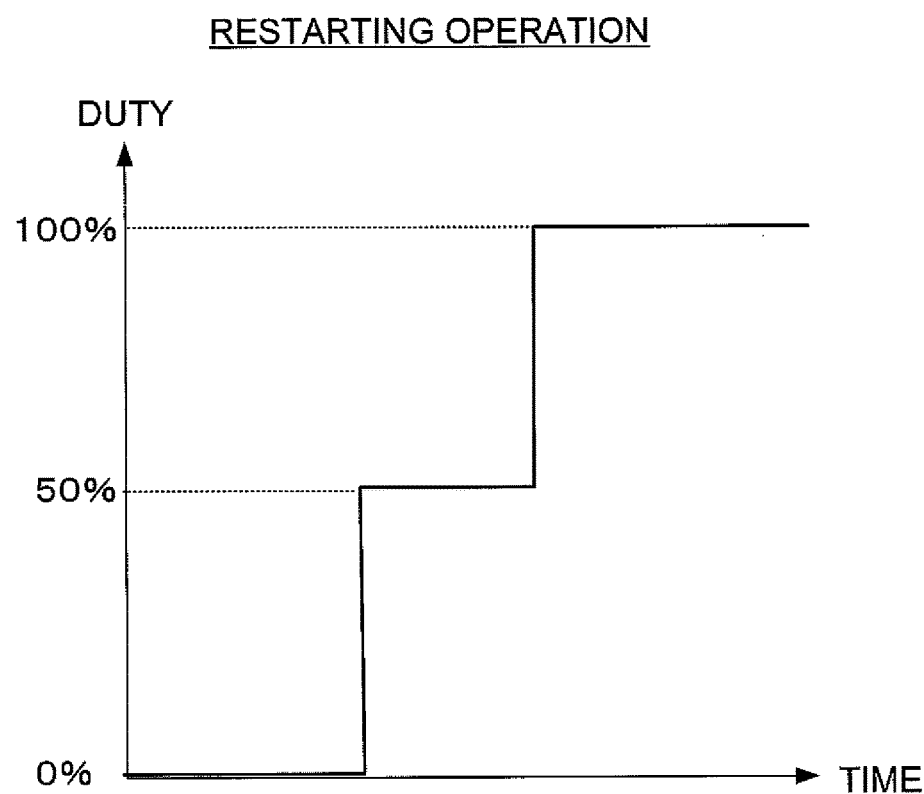

[FIG.4]
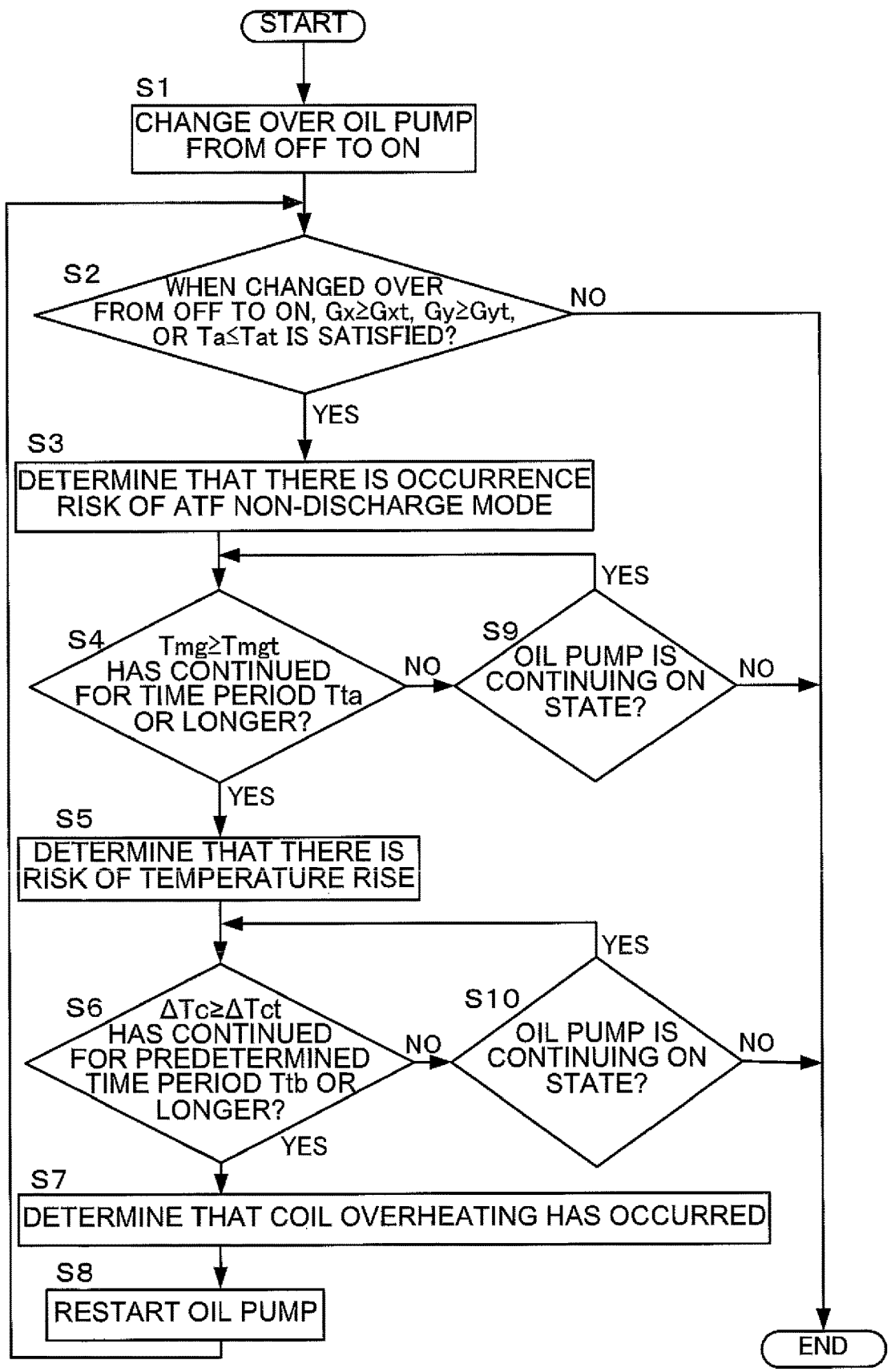

【FIG.5A】
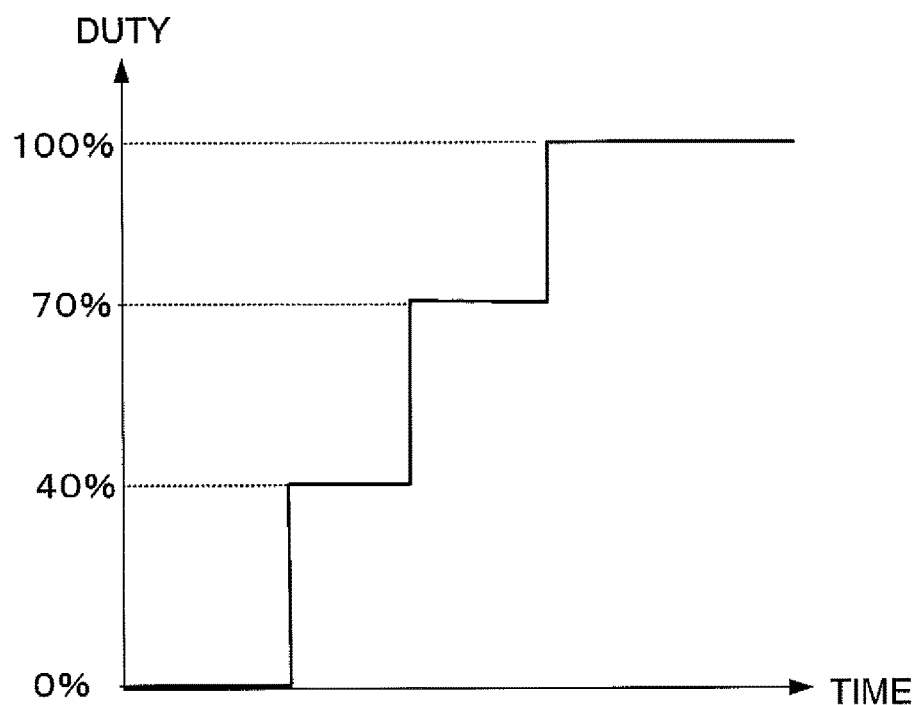
【FIG.5B】
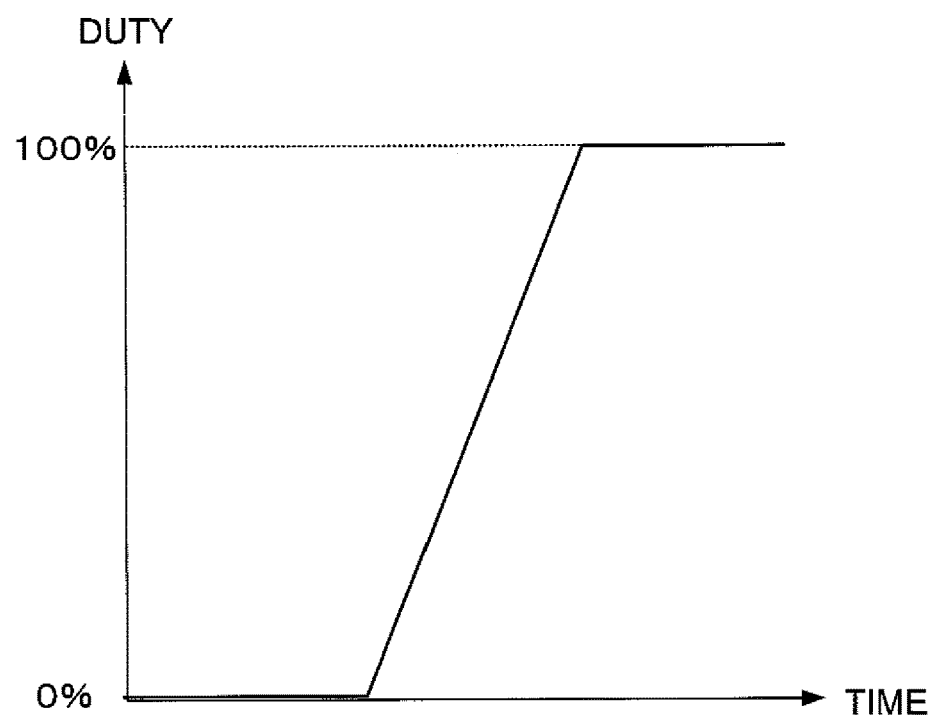

COOLING APPARATUS FOR ROTATING ELECTRICAL MACHINE

BACKGROUND OF THE INVENTION

Field of the Invention

The present disclosure relates to a cooling apparatus for cooling a rotating electrical machine.

Background

A cooling apparatus is per se known (refer to Patent Document #1) that includes a coolant circulation conduit disposed at an upper part of a motor, in which a stator is provided around the external periphery of a rotor, and including discharge holes formed in a circumferential wall thereof for discharging coolant, and that cools the stator with coolant discharged from these discharge holes. Moreover, Patent Document #2 is a related art document having some relevance to the present disclosure.

CITATION LIST

Patent Literature

Patent Document #1: Japanese Laid-Open Patent Publication No. 2011-211844
Patent Document #2: Japanese Laid-Open Patent Publication No. 2011-111910

SUMMARY

When coolant supplied from a common supply source is divided by a construction adapted to provide a predetermined distribution ratio between an upper passage that pours coolant over the motor from above and a shaft inner passage that conducts coolant to the interior of a shaft of the rotor, sometimes it may happen that, due to change of the rate of supply of coolant, the allocation of coolant to the shaft inner passage may deviate in the increase direction as compared to the predetermined distribution ratio, and this state may be maintained. In this case, the motor may suffer overheating, since the amount of coolant poured on the motor becomes insufficient.

Accordingly, the object of the present disclosure is to provide a cooling apparatus for a rotating electrical machine, that is capable of avoiding overheating of the rotating electrical machine caused by shortage of the amount of coolant poured on the rotating electrical machine.

A cooling apparatus for a rotating electrical machine according to one aspect of the present disclosure includes: an intra-axle coolant supply unit that supplies coolant into a rotation shaft of the rotating electrical machine to be mounted to a vehicle; a coolant discharge unit that is disposed in a position higher than the intra-axle coolant supply unit, and that pours coolant onto the rotating electrical machine by discharging the coolant, wherein the coolant to be supplied from a predetermined supply source is conducted in a predetermined distribution ratio to the intra-axle coolant supply unit and to the coolant discharge unit; a flow rate adjustment device that is capable of adjusting a supply flow rate of the coolant; and a control device that functions as: a determination device that determines upon overheating of the rotating electrical machine caused by deviating allocation of the coolant to the intra-axle coolant supply unit in an increase direction as compared to the predetermined distribution ratio; and a recovery device that controls the flow rate adjustment device to implement a recovery operation in which the supply flow rate is decreased and then elevated, when the determination device has determined that the overheating of the rotating electrical machine is occurring.

BRIEF DESCRIPTION OF THE DRAWINGS

FIG. 1 is a sectional view showing a portion of a drive device to which a cooling apparatus according to an embodiment of the present disclosure is applied;
FIG. 2 is a functional block diagram showing an example of a control system of this cooling apparatus;
FIG. 3A is a figure showing an example of drive duty of an oil pump over a rise interval during normal operation;
FIG. 3B is a figure showing an example of drive duty of the oil pump over a rise interval during restarting;
FIG. 4 is a flow chart showing an example of a control routine according to an embodiment of the present disclosure;
FIG. 5A is a figure showing an example of drive duty for raising the supply flow rate in three stages; and
FIG. 5B is a figure showing an example of drive duty for raising the supply flow rate linearly.

DESCRIPTION OF THE EMBODIMENTS

The drive device of FIG. 1 is configured as a hybrid transaxle that is mounted to a hybrid vehicle A (hereinafter termed the "vehicle"). For convenience of illustration, the structures related to the cooling apparatus are preferentially and boldly illustrated, while other components are shown by phantom lines as appropriate. Moreover, the arrow R in FIG. 1 indicates the direction to the left of the vehicle A, the arrow L indicates the direction to right of the vehicle A, the arrow U indicates the direction upward from the vehicle A, the arrow D indicates the direction downward from the vehicle A, and the direction perpendicular to the drawing paper corresponds to the longitudinal axis of the vehicle A. The drive device 1 includes a motor-generator 2 and a casing 3 within which the motor-generator 2 and other structural components are housed. The motor-generator 2 includes a stator 6 that is fixed to the casing 3, and a rotor 7 that is disposed in an internal perimeter of the stator 6. This motor-generator 2 corresponds to an example of the rotating electrical machine of the aspect of the present disclosure described above.

The stator 6 includes a coil 8 to which power supply lines not shown in the figures and so on are connected, and this coil 8 has a coil end 8a on a lead side to which the power supply lines are connected and a coil end 8b on an opposite lead side which is on an opposite side thereto. And the rotor 7 includes a hollow rotation shaft 10 and a rotor core 11 provided upon this rotation shaft 10. The rotation shaft 10 is supported in the casing 3 upon bearings 9 provided at both end portions thereof, so as to be capable of rotating freely around its axial line Ax. The rotor core 11 is configured as a laminated body by steel plates being laminated together along the direction of the axial line Ax, and is fixed to the rotation shaft 10 in a state of being sandwiched between a pair of fixing plates 12.

A cooling apparatus 15 for cooling the motor-generator 2 is provided to the drive device 1. This cooling apparatus 15 employs automatic transmission fluid (ATF) as one example of the coolant of the aspect described above. The cooling apparatus 15 includes an intra-axle supply pipe 17 that supplies ATF to the interior of the rotation shaft 10 and an upper pouring pipe 18 that is disposed in a position which, taking the direction of gravity as a reference, is higher than the position of the intra-axle supply pipe 17, and that pours ATF over the motor-generator 2. The intra-axle supply pipe 17 corresponds to the intra-axle coolant supply unit of the aspect of the present disclosure described above, and the upper pouring pipe 18 corresponds to an example of the coolant discharge unit of that aspect. As one example of an ATF supply source, an electrically operated type oil pump 20 whose discharge flow rate can be adjusted is provided to the cooling apparatus 15, and this oil pump 20 is provided within the casing 3. The cooling apparatus 15 conducts ATF supplied from the oil pump 20 to the intra-axle supply pipe 17 and to the upper pouring pipe 18 in a predetermined distribution ratio. The oil pump 20 sucks up the ATF that has returned to the bottom portion of the casing 3 after having cooled the motor-generator 2, and pumps it under pressure to a coolant passage 21. The oil pump 20 functions as the predetermined supply source of the aspect of the present disclosure described above, and also functions as the flow rate adjustment device of that aspect of the present disclosure described above.

The coolant passage 21 is formed in the casing 3. After extending along the direction of the axial line Ax, this coolant passage 21 then bends downward, and branches to a branch portion 22 at a branching position P1 defined at the position of bending. The cross-sectional area of the portion 21a of the coolant passage 21 that extends downward is set to be smaller than that of the portion 21b that extends in the direction of the axial line AX. This downwardly extending portion 21a is connected via a buffer portion 21c to the intra-axle supply pipe 17. And the branch portion 22 is connected to the upper pouring pipe 18 via an orifice 25, which is an example of a throttling portion. The upper pouring pipe 18 is disposed above the motor-generator 2, and is connected to the branch portion 22 so as to align with the branching position P1 on a straight line L1. This straight line L1 is parallel to the axial line Ax.

The intra-axle supply pipe 17 is inserted from the interior of the buffer portion 21c of the coolant passage 21 through a boss portion 3a that projects in the direction of the axial line Ax, and into a hollow portion 10a of the rotation shaft 10. A male screw thread (not shown in the figures) is formed on the external circumference of the intra-axle supply pipe 17, and is engaged with a female screw thread (also not shown) that is formed on the internal circumference of the boss portion 3a. The intra-axle supply pipe 17 is inserted through the boss portion 3a and is screwed thereto, and thereby is fixed to the casing 3 by the male screw thread and the female screw thread being engaged with one another. The tip end portion 17a of the intra-axle supply pipe 17 is blocked. In the side wall of the intra-axle supply pipe 17 and at a position close to the tip end portion 17a, for example, four intra-axle discharge holes 28, which open in a radial direction to its outer peripheral surface, are formed at equal intervals around its circumferential direction.

In a state that the orifice 25 is set into a mounting portion 3b formed on the casing 3, the upper pouring pipe 18 is fixed to the mounting portion 3b so as to abut against the orifice 25. The other tip end portion 18a of the upper pouring pipe 18 is blocked. First through fourth discharge holes 30a through 30d, which open so as to face downwards toward the motor-generator 2, are formed on the side wall of the upper pouring pipe 18 spaced apart with appropriate intervals between them. The first discharge hole 30a is located above the coil end 8b on the opposite lead side, and the fourth discharge hole 30d is located above the coil end 8a on the lead side. The second discharge hole 30b and the third discharge hole 30c are located above the coil 8.

By the diameter of the orifice 25 being appropriately selected in consideration of the configuration of the coolant passage 21 and the branch portion 22, this cooling apparatus 15 is designed so that the distribution ratio of ATF between the intra-axle supply pipe 17 and the upper pouring pipe 18 has a predetermined distribution ratio. This distribution ratio may, for example, be defined as A:B, where A is the supply flow rate of ATF to the intra-axle supply pipe 17 and B is the supply flow rate of ATF to the upper pouring pipe 18. Accordingly, the allocated ratio of the intra-axle supply pipe 17 is defined as A/(A+B), and the allocated ratio of the upper pouring pipe 18 is defined as B/(A+B).

According to the structure described above, the ATF discharged from the oil pump 20 is conducted to the cooling passage 21, and, as shown by the arrows, is split between the intra-axle supply pipe 17 and the upper pouring pipe 18 at the branching position P1. The ATF that is conducted to the intra-axle supply pipe 17 is then discharged from the intra-axle discharge holes 28 and is supplied to the hollow portion 10a of the rotation shaft 10. Due to the centrifugal force of the rotation shaft 10, this ATF that is supplied to the hollow portion 10a of the rotation shaft 10 is then expelled from the inner peripheral side of the rotation shaft 10 into flow conduits (not shown in the figure) that are formed in the rotor core 11. This ATF that has been conducted into the flow conduits of the rotor core 11 takes heat from the rotor core 11, and then is discharged to outside the rotor core 11 and returns back to the bottom portion of the casing 3. On the other hand, the flow of ATF that is branched off toward the upper pouring pipe 18 passes through the branch portion 22 and the orifice 25, and is supplied to the upper pouring pipe 18. This ATF supplied to the upper pouring pipe 18 is then discharged from each of the first through fourth discharge holes 30a through 30d. And the ATF discharged from the discharge holes 30a through 30d is conducted downward due to gravity and poured upon the stator 6 of the motor-generator 2. This ATF that has poured upon the coil 8 takes heat from the coil 8, and then drops further downward due to gravity and returns to the bottom portion of the casing 3.

According to demands for cooling of the motor-generator 2, the cooling apparatus 15 operates the oil pump 20 between an operational state (ON) and a non-operational state (OFF). When the oil pump 20 is changed over from OFF to ON, the supply flow rate of ATF changes from zero in the direction to increase. Accompanying this change of supply flow rate, pressure fluctuation occurs in each of the flow conduits of the cooling apparatus 15. And while the vehicle A is traveling, even if the oil pump 20 is OFF, the pressures at various locations within the flow conduits fluctuate due to inertial forces due to changes of acceleration or the like acting upon the ATF that remains in the flow conduits.

In particular, when the timing at which the pressure at the branch portion 22 that branches off from the coolant passage 21 drops due to acceleration of the vehicle A or the like, and the timing at which the oil pump 20 is changed over from OFF to ON overlap one another, the pressure on the downstream side of the orifice 25, in other words the pressure within the upper pouring pipe 18, may temporarily become negative. Thereby, for example, air may be sucked in through the first discharge hole 30a, which is the closest one to the orifice 25, into the interior of the upper pouring pipe 18. Due to increase of the flow rate of ATF supply in this situation, a phenomenon, in which a dynamic equilibrium is established, may develop with air continuing to remain within the upper pouring pipe 18 and with ATF flowing to the intra-axle supply pipe 17 while almost no ATF is conducted into the upper pouring pipe 18. To put it in another manner, the allocation of ATF to the intra-axle supply pipe 17 deviates in the direction to increase, as compared to the distribution ratio designed by the orifice 25 and so on, and a state of equilibrium becomes established in which this situation continues. Since, if the system falls into this state of equilibrium, the amount of ATF discharged from the upper pouring pipe 18 is reduced to an unacceptable level. Herein, for convenience, this state of equilibrium will subsequently be termed the "ATF non-discharge mode".

The ATF non-discharge mode occurs randomly, depending upon the timing of the oil pump 20 going OFF and ON and the running state of the vehicle A. When once the system has entered the ATF non-discharge mode, this situation may continue as long as the oil pump 20 continues to operate, provided that there is no trigger to end the situation such as a disturbance or the like. Therefore, the cooling for the coil 8 of the motor-generator 2 becomes insufficient due to a shortage of the amount of ATF discharged from the upper pouring pipe 18. As a result, the temperature of the coil 8 rises up to near the allowable limit, and overheating of the coil may well occur. Coil overheating corresponds to an example of overheating of the rotating electrical machine in the aspect described above. When the coil overheating has occurred due to the ATF non-discharge mode, then the cooling apparatus 15 stops and restarts the oil pump 20 in order to cancel the ATF non-discharge mode. This restart is an operation in which the oil pump 20 is changed over from ON to OFF so that the flow rate of ATF supply decreases to zero, and then the oil pump 20 is changed over from OFF back to ON again so that the flow rate of ATF supply is increased. When restarting, at the timing when the oil pump 20 changes from ON to OFF, the balance between the internal pressure in the upper pouring pipe 18 downstream of the orifice 25 and the internal pressure upstream of the orifice 25 is lost, so that the ATF non-discharge mode is temporarily canceled. However since, as described above, the ATF non-discharge mode is a phenomenon that occurs randomly due to the timing at which the oil pump 20 changes over from OFF to ON, accordingly, if the oil pump 20 restarts at bad timing, then the system may get back into the ATF non-discharge mode for a second time. But, depending upon the timing of restarting, it may be possible to eliminate the ATF non-discharge mode and to recover the normal state in which the distribution ratio of the ATF is as designed.

The oil pump 20 is controlled by an electronic control device (refer to FIG. 2) that is mounted to the vehicle A, and that serves as a computer that controls various units of the vehicle A. In the following, a control system for the cooling apparatus 15 will be explained with reference to FIG. 2. Signals are inputted to the electronic control device (ECU) 35 from various detection device that detect information used for this control, such as sensors of various types and so on. As shown in FIG. 2, these various sensors provided to the vehicle A include an acceleration sensor 36 that outputs signals corresponding to the longitudinal acceleration Gx and to the turning acceleration Gy of the vehicle A, an oil temperature sensor 37 (also refer to FIG. 1) that is provided in the buffer portion 21c of the coolant passage 21 and that outputs a signal corresponding to the oil temperature Ta of the ATF, and a thermistor 38 that outputs a signal corresponding to the temperature Tc of the coil 8 of the motor-generator 2.

The various functional units shown in FIG. 2 are logically configured by the ECU 35 executing a predetermined program. Information from the various sensors described above is inputted to an input unit 40. The longitudinal acceleration Gx of the vehicle A, its turning acceleration Gy, the oil temperature Ta of the ATF, and the temperature Tc of the coil 8, which are inputted to the input unit 40, are sent to a coil overheating determination unit 41.

The coil overheating determination unit 41 includes: an ATF non-discharge mode determination unit 41a determining as to the possibility that the ATF non-discharge mode is occurring; a motor temperature elevation determination unit 41b determining as to the possibility that the temperature of the motor-generator 2, and in particular the temperature of the coil 8, is elevated; and a decision unit 41c deciding a determination result related to the occurrence of coil overheating on the basis of the determination results of these determination units 41a and 41b. The ATF non-discharge mode determination unit 41a refers to the longitudinal acceleration Gx of the vehicle A, to its turning acceleration Gy, and to the oil temperature Ta sent from the input unit 40, compares these with threshold values that are set in advance for each of these state variables, determines upon the possibility that the ATF non-discharge mode is occurring, i.e. the risk of occurrence of the ATF non-discharge mode, and sends the determination result Ra to the decision unit 41.

For example, the ATF non-discharge mode determination unit 41a may determine that there is a risk of occurrence of the ATF non-discharge mode if at least one of the following conditions is satisfied: that the longitudinal acceleration Gx is greater than or equal to a threshold value Gxt ($Gx \geq Gxt$); that the turning acceleration Gx is greater than or equal to a threshold value Gyt ($Gy \geq Gyt$); and that the oil temperature Ta is less than or equal to a threshold value Tat ($Ta \leq Tat$). When the longitudinal acceleration Gx or the turning acceleration Gy of the vehicle A is large, due to this, the inertial force acting upon the ATF within the flow conduits becomes large. Because of this, the pressure fluctuations within the flow conduit from the branch portion 22 via the orifice 25 to the upper pouring pipe 18 become large. If the timing at which the vehicle A goes into this state and the timing at which the oil pump 20 is changed over from OFF to ON overlap one another, then the risk of occurrence of the ATF non-discharge mode rises, because that mode can easily be induced. Furthermore, the lower the oil temperature Ta is, the higher the viscosity of the ATF becomes, and so the flow conduit resistance to flow of the ATF increases. Due to this, pulsations (pressure fluctuations) caused by the oil pump 20 become large, since the oil pump 20 is in a high load operational state that is close to the upper limit of its discharge capability. There is a tendency for the ATF non-discharge mode to be induced because of these fluctuations of pressure, and the risk of such an occurrence rises. In the above manner, the longitudinal acceleration Gx of the vehicle A, its turning acceleration Gy, and the oil temperature Ta can be considered as examples of state variables that exert an influence upon the occurrence of the ATF non-discharge mode.

The motor temperature elevation determination unit 41b acquires the torque Tmg of the motor-generator 2, and, by referring to this torque Tmg, determines upon the possibility that the amount of heat generated will be such that coil overheating will occur if the cooling is insufficient, or, to put it in another manner, upon the possibility that the temperature of the motor-generator 2 will exceed its permitted range if there is a lack of cooling. The motor temperature elevation determination unit 41b sent the result Rb of this determination to the decision unit 41c. For example, if operation with the torque Tmg being greater than or equal to a threshold value Tmgt has continued for a predetermined time period Tta or longer, then the motor temperature elevation determination unit 41b may determine that, if the cooling is insufficient, there is a possibility that increase of the temperature of the motor-generator 2 may exceed the allowable range. When the torque Tmg of the motor-generator 2 is high, the current value is correspondingly high, and accordingly the amount of heat in the coil 8 generated by Joule heating becomes higher, so that the risk of temperature elevation due to insufficient cooling leading to coil overheating becomes higher.

The decision unit 41c refers to the determination result Ra from the ATF non-discharge mode determination unit 41a and to the determination result Rb from the motor temperature elevation determination unit 41b, and if both of these determination results are affirmative, in other words if the results of these determinations are that there is a risk of occurrence of the ATF non-discharge mode and moreover that there is a risk of temperature elevation leading to coil overheating, then the decision unit 41c refers to the temperature Tc of the coil 8 and decides whether or not coil overheating is actually taking place, and sends the result R of this decision to the oil pump control unit 42. For example, the decision unit 41c may calculate the rate of temperature elevation ΔTc of the temperature Tc of the coil 8 per unit time, and may determine that coil overheating is actually taking place if a state in which this rate of temperature elevation ΔTc is greater than or equal to a threshold value ΔTct has continued for a predetermined time period Ttb or longer.

The oil pump control unit 42 refers to the result R of the above decision thus sent from the coil overheating determination unit 41, and, if the result of the decision is that coil overheating has occurred, performs restarting operation in which the oil pump control unit 42 switches the oil pump 20 from ON to OFF and then switches the oil pump 20 back from OFF to ON. And, as for example shown in FIG. 3B, during the rise interval of this restarting operation, the oil pump control unit 42 may change the drive duty of the oil pump 20 in two stages, by 50% at a time. This causes the flow rate of the supply of ATF to rise in two stages. By doing this, the fluctuations of pressure during the rise interval when restarting the oil pump 20 are mitigated, as compared to the case during normal operation of performing driving of the oil pump 20 in the rise interval with a drive duty shown in FIG. 3A. In other words, while the rate of increase per unit time of the flow rate of ATF supply in the rise interval of the oil pump 20 during normal operation is not limited, during restarting, this rate of increase is limited to being within a predetermined level. Due to this, during restarting, the pressure fluctuations within the flow conduits during the rise interval are mitigated. Accordingly, it is possible to reduce the risk of the cooling apparatus 15 getting into the ATF non-discharge mode for a second time during restarting of the oil pump 20.

The coil overheating determination unit 41 corresponds to an example of the determination device of the aspect described above. The oil pump control unit 42 corresponds to an example of the recovery device of the aspect described above. The operation of restarting the oil pump 20 corresponds to an example of the recovery operation in the aspect described above. The ECU 35 functioning as the coil overheating determination unit 41 and as the oil pump control unit 42 corresponds to an example of the control device of the aspect described above.

The control explained above performed by the ECU 35 may, for example, be implemented by the control routine shown in FIG. 4. A program for this control routine is stored in the ECU 35, and is read out and executed when a demand for cooling of the motor-generator 2 arises with the oil pump 20 in the OFF state.

In step S1, the ECU 35 changes over the oil pump 20 from OFF to ON. The ECU 35 controls the oil pump 20 so that the rate of increase per unit time of the flow rate of ATF supply is not limited, with the drive duty of the rise interval of the oil pump 20 at this time being shown in FIG. 3A. Due to this, it is possible to shorten the time interval for responding to a requirement for cooling the motor-generator 2, since it is possible to increase the flow rate of ATF supply within a short time interval.

In step S2, the ECU 35 acquires the longitudinal acceleration Gx and the turning acceleration Gy of the vehicle A and the oil temperature Ta of the ATF at the time point that the oil pump 20 is changed over from OFF to ON, compares those parameters with their corresponding threshold values Gxt, Gyt, and Tat, and thereby makes a determination of the risk of occurrence of the ATF non-discharge mode. For example, as described above, the ECU may determine that there is a risk of occurrence of the ATF non-discharge mode if at least one of the following conditions is satisfied: the longitudinal acceleration Gx is greater than or equal to its threshold value Gxt (Gx≥Gxt); the turning acceleration Gy is greater than or equal to its threshold value Gyt (Gy≥Gyt); and the oil temperature Ta is less than or equal to its threshold value Tat (Ta≤Tat).

If there is a risk of occurrence of the ATF non-discharge mode, then the flow of control proceeds to step S3, and, for example, the ECU 35 may set a flag F1 for managing the presence or absence of risk of occurrence of the ATF non-discharge mode. On the other hand, if there is no risk of occurrence of the ATF non-discharge mode, then the flow of control skips the subsequent processing and this iteration of the routine terminates.

In step S4, the ECU 35 makes a determination as to the risk of elevation of the temperature of the motor-generator 2. For example, the ECU 35 may acquire the torque Tmg of the motor-generator 2, and may make a determination as to whether or not the state with this torque Tmg being greater than or equal to its threshold value Tmgt has continued for the predetermined time period Tta or longer. Since it is possible to determine that there is a risk of elevation of the temperature of the motor-generator 2 when this condition is satisfied, accordingly the flow of control proceeds to step S5, and, for example, the ECU 35 may set a flag F2 for managing the presence or absence of risk of temperature rise.

On the other hand, if the condition of step S4 is not satisfied and it can be determined that there is no risk of elevation of the temperature of the motor-generator 2, then the flow of control proceeds to step S9 and a determination is made as to whether or not the oil pump 20 is continuing to be in the ON state. For example, if there is no cooling demand for the motor-generator 2 when the vehicle A is stopped or the like, then the oil pump 2 is turned OFF under the control of a separate routine not shown in the figures. Due to this, in the processing of step S9, a check is made as to whether or not the oil pump 20 is OFF by this state. If the oil pump 20 is continuing to be in the ON state, then the flow of control returns to step S4, while if this is not the case then this routine terminates. Except when the oil pump 20 is OFF, the decision as to the risk of temperature elevation of the motor-generator 2 is repeated in step S4, since there is a possibility that the ATF non-discharge mode may persist as long as the oil pump 20 continues to be ON.

In step S6, the ECU 35 makes a decision as to whether or not overheating of the coil 8 is actually taking place. For example, by referring to the signal from the thermistor 38, the ECU 35 may calculate the rate ΔTc of temperature elevation per unit time of the temperature Tc of the coil 8, and may make a decision as to whether or not the state in which the rate ΔTc of temperature elevation is greater than or equal to its threshold value ΔTct has continued for the predetermined time period Ttb or longer. If the condition in step S6 is satisfied, then, since it can be determined that coil overheating caused by the ATF non-discharge mode is actually taking place, accordingly the flow of control proceeds to step S7, in which, for example, the ECU 35 may set a flag F3 for managing the presence or absence of the occurrence of coil overheating.

On the other hand, if it can be determined that the condition of step S6 is not satisfied, so that coil overheating is not taking place, then the flow of control proceeds to step S10, and a decision is made as to whether or not the oil pump 20 is continuing to be in the ON state. If the oil pump 20 is continuing to be in the ON state, then the flow of control returns to step S6, while otherwise this routine terminates. Since there is a possibility that the ATF non-discharge mode will persist as long as the oil pump 20 continues to be in the ON state, accordingly the decision in step S6 as to whether or not coil overheating is taking plate is repeated, provided that the oil pump 20 has not gone to OFF.

In step S8, the ECU 35 restarts the oil pump 20, and then the flow of control returns to step S2. In the rise interval during this restarting, for example, the drive duty of the oil pump 20 may be changed in two stages, as described above.

By executing the processing of steps S1 through S7, S9, and S10 of the control routine of FIG. 4, the ECU 35 functions as the coil overheating determination unit 41 of FIG. 2, and, by executing the processing of step S8, the ECU 35 functions as the oil pump control unit 42 of FIG. 2. Moreover, by executing the processing of step S2 of the control routine of FIG. 4, the ECU 35 functions as the ATF non-discharge mode determination unit 41a of FIG. 2. By executing the processing of step S4, the ECU 35 functions as the motor temperature elevation determination unit 41b of FIG. 2. By executing the processing of step S6, the ECU 35 functions as the decision unit 41c of FIG. 2.

Advantageous Effects of this Embodiment

According to the cooling apparatus 15 of this embodiment, the oil pump 20 is restarted when it has been determined that coil overheating is taking place due to the ATF non-discharge mode. Accordingly, after the ATF non-discharge mode has been cancelled, it is possible for the system to recover to its normal state without the ATF non-discharge mode being gone into for a second time.

By the drive duty being set in two stages as shown in FIG. 3B during the rise interval when the oil pump 20 is being restarted, the cooling apparatus 15 restricts the amount of increase per unit time of the flow rate of ATF supply by keeping it within a predetermined level. Since, due to this, the change of the flow rate of ATF supply is kept gentle, accordingly it is possible to reduce the pressure fluctuations within the flow conduits during restarting, so that it is possible to reduce the risk of the ATF non-discharge mode becoming established for a second time during restarting. Therefore, the probability of canceling the ATF non-discharge mode and recovering to the normal operational state is increased.

With this cooling apparatus 15, the oil pump 20 is restarted when it has been determined, at least, that there is a risk of occurrence of the ATF non-discharge mode and moreover that there is a risk of elevation of the temperature of the motor-generator 2. Accordingly, even if the system goes into the ATF non-discharge mode, restarting will not be performed if the motor-generator 2 is operated only at a level at which overheating of the coil is not approached. Therefore, it is possible to reduce the consumption of electrical power associated with restarting, since excessive restarting is suppressed. This cooling apparatus 15 suppresses the implementation of restarting to yet a further level, since the oil pump 15 is only restarted after it has been determined that there is a risk of occurrence of the ATF non-discharge mode and also that there is a risk of elevation of the temperature of the motor-generator 2, and furthermore after a determination has been made as to the actual presence or absence of coil overheating.

In step S2 of FIG. 4, the cooling apparatus 15 refers to the longitudinal acceleration Gx and to the turning acceleration Gy of the vehicle A, and to the oil temperature Ta of the ATF, which are state variables of the vehicle A that influence the occurrence of the ATF non-discharge mode, and determines that there is a risk of occurrence of the ATF non-discharge mode if at least one of the conditions provided relating to these state variables is satisfied. Due to this, the accuracy of determination of this risk of occurrence is enhanced. Moreover, the risk of elevation of the temperature of the motor-generator 2 is determined by referring to its torque Tmg, which is a state variable that exerts influence upon the coil overheating. Due to this, the accuracy of determination of the risk is enhanced.

As shown in FIG. 1, in this cooling apparatus 15, the coolant passage 21 extends downward from the branching position P1 with the branch portion 22 and is connected to the intra-axle supply pipe 17, and the upper pouring pipe 18 is connected to the branch portion 22 so as to align with the branching position P1 on the straight line L1, and moreover the intra-axle supply pipe 17 and the upper pouring pipe 18 both extend in the same direction from their respective originating points, which are respectively the connection position of the intra-axle supply pipe 17 with the coolant passage 21 and the connection position of the upper pouring pipe 18 with the branch portion 22. Due to this, the motor-generator 2 has a compact structure in which increase of the dimension of the rotation shaft 10 in the direction of its axial line Ax is suppressed.

VARIANT EMBODIMENTS

The embodiment described above is a system for cooling the motor-generator 2 which is mounted to the vehicle A which is a hybrid vehicle, but this motor-generator 2 is only one example of a rotating electrical machine that can be mounted to a vehicle. For example, it would be possible for the vehicle to be changed to be an electric automobile, in which case the motor-generator that is mounted to the vehicle may be changed to being a different example of a rotating electrical machine. Moreover, it would be possible to change these motor-generators by replacing them with electric motors or with generators. In such aspects, the electric motor or the generator would correspond to an example of a rotating electrical machine.

In the embodiment described above, a construction is disclosed in which the intra-axle supply pipe 17 is provided as being one example of an intra-axle coolant supply unit and this intra-axle supply pipe 17 is inserted into the hollow portion 10a of the rotation shaft 10, and ATF is supplied to the interior of the axis of the rotation shaft 10 by ATF being discharged from this pipe 17, but these arrangements could be changed. For example, as another example of an intra-axle coolant supply unit, the construction could be altered by forming an intra-axle supply flow conduit in the interior of the rotation shaft itself, and ATF could be supplied to this intra-axle supply flow conduit.

In the embodiment described above, a construction is disclosed in which the upper pouring pipe 18 is provided as one example of a coolant discharge unit, and ATF is poured onto the motor-generator 2 by this upper pouring pipe 18, but these arrangements could be changed. For example, as another example of a coolant discharge unit, the construction could be altered by forming an upper discharge flow conduit in the casing 3 having discharge holes positioned above the motor-generator 2, and by supplying ATF to this upper discharge flow conduit. Furthermore, it would also be possible, for example, to pour the ATF onto the motor-generator 2 slantingly in the horizontal direction. Accordingly, it would also be possible to change the positions of installation of the upper pouring pipe 18 and of the upper discharge flow conduit, provided that they are positioned higher than the intra-axle supply pipe 17.

In the embodiment described above, by way of example, the coolant passage 21 is formed in the casing 3, However, it would also be possible to alter this structure by providing a coolant pipe as another example of the coolant passage that is separable from the casing 3, and by conducting the ATF with this coolant pipe.

In the embodiment described above, the orifice 25 is employed as a means for determining the ratio of distribution of the ATF between the intra-axle supply pipe 17 and the upper pouring pipe 18. However, a variant construction would also be possible in which the distribution ratio is determined by providing a venturi or the like, instead of the orifice 25. Moreover, such determination of the distribution ratio by providing a throttling portion that is a mechanical element such as the orifice 25 or a venturi or the like is only an example. It would also be possible to change to a configuration in which, for example, this type of throttling portion is not provided, but rather the flow conduit area ratio of the flow conduits that conduct the ATF is set so as to provide a predetermined distribution ratio. In such a case, there may not be an intentionally provided throttling, or a throttling portion being a separate member from the flow conduit.

In the embodiment described above, the longitudinal acceleration Gx and the turning acceleration Gy of the vehicle A and the oil temperature Ta of the ATF are referred as state variables that exerted influence upon the occurrence of the ATF non-discharge mode, but these are only mentioned by way of example. Even when the vehicle A ascends a slope or the like, it experiences the influence of gravity, and there is a possibility that this may exert an influence upon the occurrence of the ATF non-discharge mode. Accordingly, for example, a variant embodiment is possible in which the tilt angle of the vehicle A becoming greater than or equal to a threshold value is added as one of the conditions described above. And moreover, it may be altered to an aspect referring to "at least one" of the state variables. Thus, when two or more of the above conditions of the above type related to state variables are combined, either an OR condition or an AND condition may be employed.

While the embodiment described above is an aspect in which the oil pump 20 is restarted if it is determined in step S2 of FIG. 4 that there is a risk of occurrence of the ATF non-discharge mode, and if it is determined in step S4 that there is a risk of elevation of the temperature of the motor-generator 2, and moreover if in step S6 it is determined that overheating of the coil is occurring, it may be modified. For example, it would be possible to change the embodiment to an aspect in which the processing of steps S4 and S6 is omitted, and the oil pump 20 is restarted if it is determined in step S2 that there is a risk of occurrence of the ATF non-discharge mode and it is considered as occurrence of coil overheating. Furthermore, it would also be possible to change the embodiment to an aspect in which step S4 is omitted, and the oil pump 20 is restarted if it is determined in step S2 that there is a risk of occurrence of the ATF non-discharge mode, and moreover if in step S6 it is determined that coil overheating actually takes place.

While, in the embodiment described above, the risk of elevation of the temperature of the motor-generator 2 is determined in step S4 in the state in which the risk of occurrence of the ATF non-discharge mode has been determined in step S2 of FIG. 4, an embodiment would also be possible to be changed to an aspect in which these processes are interchanged. In this case excessive implementation of restarting can be prevented, since the risk of occurrence of the ATF non-discharge mode is only determined when there is a risk of elevation of the temperature of the motor-generator 2.

In the embodiment described above, the oil pump 20 is provided and is an example of the oil supply source and also is an example of the flow rate adjustment device, and the flow rate of supply of the ATF is adjusted by controlling the oil pump 20, but this could be changed. For example, it would be possible to implement an altered embodiment in which a control valve (not shown in the figures) whose opening amount can be adjusted is provided in a coolant passage on the downstream side of the oil pump in FIG. 1 and upstream of the branching position P1, and in which the flow rate of ATF supply is adjusted by controlling this control valve while maintaining the oil pump 20 in an operating state.

In this case, the oil pump 20 would correspond to an example of the supply source, and the control valve would correspond to another example of the flow rate adjustment device. And actuation of the control valve corresponding to restarting of the oil pump 20 would become actuation for changing over from the state in which the above passage is open to the state in which it is closed, and then changing over from the state in which the above passage is closed to the state in which it is opened.

The restarting of the oil pump 20 and the operation of the control valve described above corresponding to this restarting serve to bring the supply flow rate of ATF temporarily down to zero, but it would also be possible to change the embodiment to an aspect in which, without the supply flow rate being actually brought to zero, the supply flow rate is temporarily decreased and then is increased. Even if the supply flow rate is not temporarily brought down to zero, it is still possible to eliminate the ATF non-discharge mode and to get back to the state of normal operation, since accompanying pressure fluctuations are engendered in the flow conduits.

In the embodiments described above, when the flow rate of ATF supply is increased after having been decreased or been brought down to zero, as shown in FIG. 3B, the flow rate of the ATF supply is elevated in two stages by changing the drive duty in two stages, but this could be changed. For example, it would be possible to change the embodiment as shown in FIG. 5A or as shown in FIG. 5B. FIG. 5A shows an embodiment in which the drive duty is changed in three stages, while FIG. 5B shows an embodiment in which the drive duty is changed linearly so that the supply amount of ATF increases smoothly and gradually. In these embodiments as well, it is possible to suppress fluctuations of pressure when increasing the flow rate of ATF supply, since the rate of increase per unit time of the supply amount of ATF is limited to a predetermined level. Due to this, it is possible to reduce the risk of occurrence of the ATF non-discharge mode. Setting the drive duty in three stages as shown in FIG. 5A is an example of setting it in multiple stages, and the number of stages can also be made to be greater than three. It would also be possible to alter the linear change of drive duty shown in FIG. 5B so that the drive duty changes along a curve that increases gradually.

It would also be acceptable to prepare in advance a plurality of patterns of elevation for elevating the flow rate of ATF supply, as shown in FIGS. 3B, 5A, and 5B and described in connection with these variant embodiments, and to implement operation to change over between these patterns of elevation according to state variables that exert influence upon occurrence of the ATF non-discharge mode as described above, such as the longitudinal acceleration Gx of the vehicle A and so on. By doing this, it becomes possible to select a pattern of elevation corresponding to the magnitude of the risk of occurrence of the ATF non-discharge mode, and accordingly it is possible to reduce the risk of the system getting into the ATF non-discharge mode for a second time by restarting of the oil pump 20 or the like.

In the embodiment and variant embodiments described above, the motor-generator 2 is cooled with ATF, but, instead of ATF, it would be possible to change to an aspect cooling the motor-generator 2 with some other coolant in liquid form, such as, for example, hybrid transaxle fluid or some other type of gear oil.

The structure and the arrangement of the coolant passage 21, the branch portion 22, the intra-axle supply pipe 17, and the upper pouring pipe 18 in the embodiment described above are only examples. It would also be possible, for example, to provide the branch portion 22 between the intra-axle supply pipe 17 and the upper pouring pipe 18, and to change to an arrangement in which the branching position from the coolant passage 21 and the upper pouring pipe 18 are not aligned upon a straight line. Furthermore, it would also be acceptable to provide an arrangement in which the intra-axle supply pipe 17 and the upper pouring pipe 18 extend in opposite directions. Furthermore, it would also be possible to apply a similar type of arrangement to the intra-axle supply flow conduit and to the upper discharge flow conduit of the variant embodiments described above.

The correspondence relationship between the aspect of the present disclosure described above and each of the above described embodiments and variant embodiments may be summarized as follows. That is, in the embodiment and the variant embodiments described above: the motor-generator 2, the electric motor, or the generator corresponds to an example of the rotating electrical machine of the aspect described above; the ATF, the hybrid transaxle fluid, or the other gear oil corresponds to an example of the coolant of that aspect; the intra-axle supply pipe 17 or the intra-axle supply flow conduit corresponds to an example of the intra-axle coolant supply unit of that aspect; the upper pouring pipe 18 or the upper discharge flow conduit corresponds to an example of the coolant discharge unit of that aspect; the oil pump 20 corresponds to an example of the supply source of that aspect; the oil pump 20 or the control valve provided on the downstream side of the oil pump 20 corresponds to an example of the flow rate adjustment device of that aspect; coil overheating corresponds to an example of the overheating of the rotating electrical machine in that aspect; the coil overheating determination unit 41 corresponds to an example of the determination device of that aspect; the oil pump control unit 42 corresponds to an example of the recovery device of that aspect; operation to restart the oil pump 20 or operation to elevate the supply flow rate of ATF or the like with the oil pump 20 or with the control valve after having reduced it corresponds to an example of recovery operation of that aspect; and the ECU 35 functioning as the coil overheating determination unit 41 and as the oil pump control unit 42 corresponds to an example of the control device of that aspect.

Aspects of the present disclosure derived from each of the embodiments and variant embodiments described above will now be explained.

A cooling apparatus for a rotating electrical machine according to one aspect of the present disclosure includes: an intra-axle coolant supply unit that supplies coolant into a rotation shaft of the rotating electrical machine to be mounted to a vehicle; a coolant discharge unit that is disposed in a position higher than the intra-axle coolant supply unit, and that pours coolant onto the rotating electrical machine by discharging the coolant, wherein the coolant to be supplied from a predetermined supply source is conducted in a predetermined distribution ratio to the intra-axle coolant supply unit and to the coolant discharge unit; a flow rate adjustment device that is capable of adjusting a supply flow rate of the coolant; and a control device that functions as: a determination device that determines upon overheating of the rotating electrical machine caused by deviating allocation of the coolant to the intra-axle coolant supply unit in an increase direction as compared to the predetermined distribution ratio; and a recovery device that controls the flow rate adjustment device to implement a recovery operation in which the supply flow rate is decreased and then elevated, when the determination device has determined that the overheating of the rotating electrical machine is occurring.

According to the cooling apparatus according to this aspect, when it has been determined that overheating of the rotating electrical machine originating in the fact that the allocation of coolant to the intra-axle coolant supply unit has deviated in the increase direction as compared to the predetermined distribution ratio has occurred, then recovery operation is performed to reduce the supply flow rate of coolant and then to increase it. Due to this, the state of equilibrium, in which the deviation in the above described increase direction continues due to the timing of implementation of the recovery operation, is canceled, and it is possible for the distribution ratio to recover to the normal state without getting into this state of equilibrium for a second time. Accordingly, the robustness of control is enhanced, since a device is made available to recover from this state of equilibrium to the normal state.

In this aspect, it would also be acceptable to arrange for the determination device to determine upon the overheating of the rotating electrical machine on the basis of a determination result of a first determination for determining possibility of occurrence of continuation of deviation in the increase direction, and a determination result of a second determination for determining possibility of temperature elevation of the rotating electrical machine. In this case, it is possible to suppress excessive implementation of the recovery operation, as compared to the case in which it is decided to implement the recovery operation only based upon the determination result of the first determination or only upon the determination result of the second determination. Due to this, it is possible to reduce the energy consumption associated with implementation of the recovery operation. Furthermore, in the embodiment described above and the variant embodiments described above, the occurrence of the ATF non-discharge mode corresponds to an example of the "occurrence of continuation of deviation in the increase direction" in this case. Furthermore, the processing performed by the ATF non-discharge mode determination unit 41a of FIG. 2 or the processing of step S2 of FIG. 4 corresponds to an example of the first determination, and the processing performed by the motor temperature elevation determination unit 41b of FIG. 2 or the processing of step S4 of FIG. 4 corresponds to an example of the second determination.

It would also be acceptable to arrange for the determination device to perform the first determination by referring to at least one of longitudinal acceleration of the vehicle, turning acceleration of the vehicle, a tilt angle of the vehicle, and coolant temperature of the coolant. In this case the accuracy of determination is enhanced by performing the first determination with reference to at least one of these state variables, since they exert influence upon the occurrence of the state of equilibrium described above. Furthermore, in the embodiment and in each of the variant embodiments described above, the oil temperature Ta of the ATF or the temperature of the hybrid transaxle fluid or of some other gear oil corresponds to an example of the coolant temperature.

It would also be acceptable for the determination device to perform the second determination by referring to a torque of the rotating electrical machine. In this case, since the torque of the rotating electrical machine is a state variable that exerts an influence upon elevation of the temperature of the rotating electrical machine, accordingly the accuracy of determination is enhanced by performing the second determination by referring to the torque of the rotating electrical machine. Furthermore, in the embodiment and in each of the variant embodiments described above, the motor torque Tmg of the motor-generator 2 or the torque of an electric motor or of a generator corresponds to an example of the torque of the rotating electrical machine.

In this aspect, it would also be acceptable to arrange for the recovery device to control the flow rate adjustment device so that an operation, in which the supply flow rate is reduced and then the supply flow rate is elevated while keeping a rate of increase per unit time of the supply flow rate within a predetermined level, is implemented as the recovery operation. In this case, during the recovery operation, since the rate of increase per unit time of the supply flow rate is limited within the predetermined level, accordingly the supply flow rate rises gently, and it becomes more difficult for the above described state of equilibrium to be induced. Accordingly, the probability of recovery to the normal state becomes high by the recovery operation.

As a case of limiting the rate of increase described above to a predetermined level, it would also be acceptable to arrange for the recovery device to control the flow rate adjustment device so that an operation, in which the supply flow rate is reduced and then the supply flow rate is gradually elevated, is implemented as the recovery operation. Moreover, it would also be acceptable to arrange for the recovery device to control the flow rate adjustment device so that an operation, in which the supply flow rate is reduced and then the supply flow rate is elevated in a plurality of stages, is implemented as the recovery operation.

As a case of limiting the rate of increase described above to a predetermined level, it would also be acceptable to arrange for the recovery device to control the flow rate adjustment device so that an operation, in which a plurality of elevation patterns for elevating the supply flow rate after reducing the supply flow rate is changed over according to a state variable of the vehicle, is implemented as the recovery operation. In this case, it becomes possible, by referring to the above mentioned state variable, to select a pattern of elevation that corresponds to the magnitude of the risk of occurrence of deviation of the distribution ratio in the increase direction as described above. Due to this, it is possible to reduce the risk of the distribution ratio deviating in the increase direction for a second time by implementation of the recovery operation. Furthermore, in the embodiment and the variant embodiments described above, the patterns of change between a plurality of drive duties in the embodiments shown in FIGS. 3B, 5A, and 5B correspond to an example of the plurality of patterns of elevation.

In the aspect described above, it would also be acceptable to arrange, as the flow rate adjustment device, for an electrically operated oil pump capable of adjusting a discharge flow rate to be provided, and, to arrange for the recovery device to control the oil pump so that restarting, in which the oil pump is changed over from an operational state to a non-operational state and then changed over to the operational state again, is implemented as the recovery operation. Since, due to the restarting of the oil pump, the supply flow rate of the coolant increases after having decreased, accordingly it is possible to cancel the state of equilibrium described above and to recover to the normal state.

In the aspect described above, it would also be acceptable to arrange for there to be further included: a coolant passage that conducts the coolant; and a branch portion that branches from the coolant passage, and for the coolant passage to extend downward from a branching position of the branch portion, and to be connected to the intra-axle supply unit, for the coolant discharge unit to be connected to the branch portion so as to be aligned with the branching position on the same straight line, for the intra-axle supply unit to extend from a connection position with the coolant passage which is an origin point thereof, and for the coolant discharge unit to extend from a connection position with the branch portion which is an origin point thereof so as to extend in the same direction as the intra-axle coolant supply unit. In this case, it is possible to obtain a compact construction in which increase of the dimension of the rotation shaft of the rotating electrical machine in the direction of its axial line is suppressed.

This application claims the benefit of Japanese Patent Application No. 2017-225874, filed Nov. 24, 2017, which is hereby incorporated by reference herein in its entirety.

What is claimed is:

1. A cooling apparatus for a rotating electrical machine comprising:
an intra-axle coolant supply unit that supplies coolant into a rotation shaft of the rotating electrical machine to be mounted to a vehicle;
a coolant discharge unit that is disposed in a position higher than the intra-axle coolant supply unit, and that pours coolant onto the rotating electrical machine by discharging the coolant, wherein the coolant to be supplied from a predetermined supply source is conducted in a predetermined distribution ratio to the intra-axle coolant supply unit and to the coolant discharge unit;

a flow rate adjustment device that is capable of adjusting a supply flow rate of the coolant; and a control device that functions as:
- a determination device that determines upon overheating of the rotating electrical machine caused by deviating allocation of the coolant to the intra-axle coolant supply unit in an increase direction as compared to the predetermined distribution ratio; and
- a recovery device that controls the flow rate adjustment device to implement a recovery operation in which the supply flow rate is decreased and then elevated, when the determination device has determined that the overheating of the rotating electrical machine is occurring.

2. A cooling apparatus according to claim 1, wherein the determination device determines upon the overheating of the rotating electrical machine on the basis of a determination result of a first determination for determining possibility of occurrence of continuation of deviation in the increase direction, and a determination result of a second determination for determining possibility of temperature elevation of the rotating electrical machine.

3. A cooling apparatus according to claim 2, wherein the determination device performs the first determination by referring to at least one of longitudinal acceleration of the vehicle, turning acceleration of the vehicle, a tilt angle of the vehicle, and coolant temperature of the coolant.

4. A cooling apparatus according to claim 2, wherein the determination device performs the second determination by referring to a torque of the rotating electrical machine.

5. A cooling apparatus according to claim 1, wherein the recovery device controls the flow rate adjustment device so that an operation, in which the supply flow rate is reduced and then the supply flow rate is elevated while keeping a rate of increase per unit time of the supply flow rate within a predetermined level, is implemented as the recovery operation.

6. A cooling apparatus according to claim 5, wherein the recovery device controls the flow rate adjustment device so that an operation, in which the supply flow rate is reduced and then the supply flow rate is gradually elevated, is implemented as the recovery operation.

7. A cooling apparatus according to claim 5, wherein the recovery device controls the flow rate adjustment device so that an operation, in which the supply flow rate is reduced and then the supply flow rate is elevated in a plurality of stages, is implemented as the recovery operation.

8. A cooling apparatus according to claim 5, wherein the recovery device controls the flow rate adjustment device so that an operation, in which a plurality of elevation patterns for elevating the supply flow rate after reducing the supply flow rate is changed over according to a state variable of the vehicle, is implemented as the recovery operation.

9. A cooling apparatus according to claim 1, wherein, as the flow rate adjustment device, an electrically operated oil pump capable of adjusting a discharge flow rate is provided, and, the recovery device controls the oil pump so that restarting, in which the oil pump is changed over from an operational state to a non-operational state and then changed over to the operational state again, is implemented as the recovery operation.

10. A cooling apparatus according to claim 1, further comprising:

a coolant passage that conducts the coolant; and a branch portion that branches from the coolant passage, wherein the coolant passage extends downward from a branching position of the branch portion, and is connected to the intra-axle supply unit, wherein the coolant discharge unit is connected to the branch portion so as to be aligned with the branching position on a same straight line, and the intra-axle coolant extends from a connection position with the coolant passage which is an origin point thereof, and the coolant discharge unit extends from a connection position with the branch portion which is an origin point thereof so as to extend in a same direction as the intra-axle coolant supply unit.

* * * * *